United States Patent
Stinson

(10) Patent No.: US 7,233,487 B2
(45) Date of Patent: Jun. 19, 2007

(54) NON-INVASIVE CAB LAPTOP COMPUTER STAND FOR OVER-THE-ROAD VEHICLES

(76) Inventor: Roy L. Stinson, P.O. Box 165, Locust Grove, OK (US) 74352

(*) Notice: Subject to any disclaimer, the term of this patent is extended or adjusted under 35 U.S.C. 154(b) by 0 days.

(21) Appl. No.: 11/444,718

(22) Filed: Jun. 1, 2006

(65) Prior Publication Data

US 2006/0279921 A1    Dec. 14, 2006

Related U.S. Application Data

(60) Provisional application No. 60/689,135, filed on Jun. 8, 2005.

(51) Int. Cl.
*G06F 1/16* (2006.01)

(52) U.S. Cl. .................. 361/681; 361/679; 312/223.3; 248/918

(58) Field of Classification Search ................. 361/683
See application file for complete search history.

(56) References Cited

U.S. PATENT DOCUMENTS

| | | | | |
|---|---|---|---|---|
| 4,345,147 A | * | 8/1982 | Aaron et al. ................. | 235/385 |
| 4,946,120 A | * | 8/1990 | Hatcher .................... | 248/183.2 |
| 5,279,488 A | * | 1/1994 | Fleming .................... | 248/279.1 |
| 5,564,668 A | | 10/1996 | Crowe, II | |
| 5,667,272 A | * | 9/1997 | Sutton ........................ | 297/140 |
| 5,951,128 A | | 9/1999 | Aidone et al. | |
| 5,973,917 A | | 10/1999 | White | |
| 6,135,549 A | | 10/2000 | Demick et al. | |
| 6,239,971 B1 | * | 5/2001 | Yu et al. ..................... | 361/695 |
| 6,382,745 B1 | * | 5/2002 | Adkins .................... | 312/223.3 |
| 6,386,413 B1 | * | 5/2002 | Twyford ..................... | 224/553 |
| 6,692,051 B1 | * | 2/2004 | Cook et al. .............. | 296/24.39 |

* cited by examiner

*Primary Examiner*—Anatoly Vortman
*Assistant Examiner*—Anthony Q. Edwards
(74) *Attorney, Agent, or Firm*—William S. Dorman

(57) ABSTRACT

A laptop computer stand for a cab for an over-the-road vehicle wherein the cab is provided with a passenger seat, comprising a pair of longitudinally extending horizontal arms having forward ends and rear ends, one horizontal arm being attached to an inboard side of the seat and the other horizontal arm being attached to an outboard side of the seat, a curved arm having a horizontal portion extending across the forward ends of the two horizontal arms and being connected thereto, a vertical arm having an upper end and a lower end, the curved arm also having a vertical portion at an inboard end thereof connecting with the lower end of the vertical arm, a diagonal arm connected to and extending from the vertical arm to the rear end of the inboard arm and being connected thereto, a horizontal rectangular bed for receiving and supporting a laptop computer thereon, means connecting the bed to the upper end of the vertical arm so as to support the laptop computer over the seat.

5 Claims, 4 Drawing Sheets

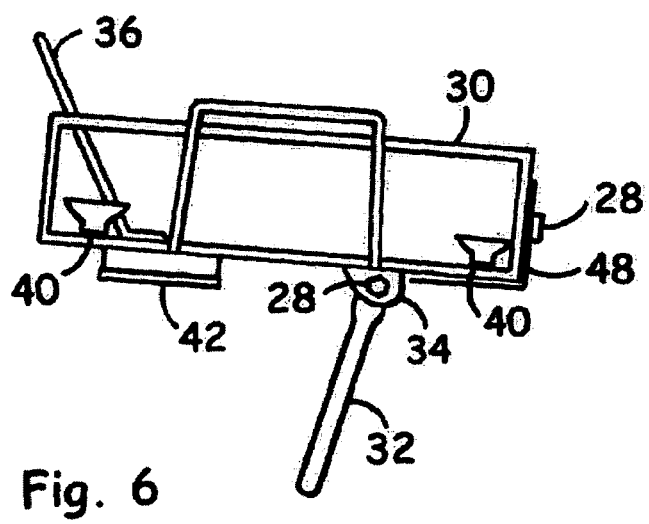
Fig. 6
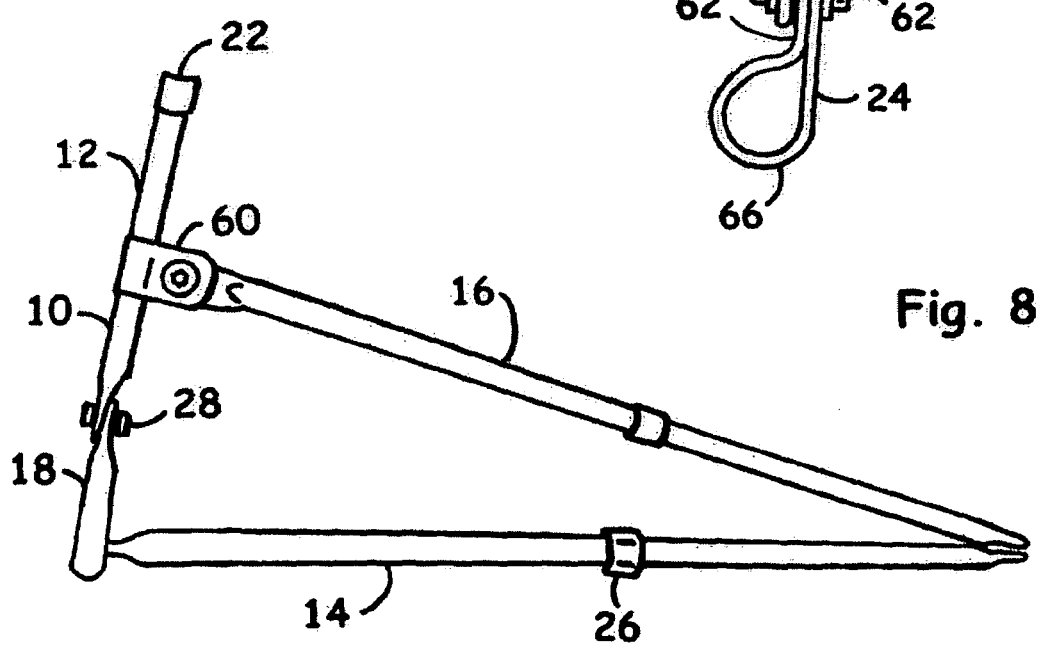
Fig. 8
Fig. 7

NON-INVASIVE CAB LAPTOP COMPUTER STAND FOR OVER-THE-ROAD VEHICLES

This is a non-provisional application which is based upon provisional application Ser. No. 60/689,135, filed Jun. 8, 2005.

BACKGROUND OF THE INVENTION

1. Field of the Invention

The present invention relates to a non-invasive laptop computer support attachment, or laptop computer stand, for tractor-trailer truck cabs, also known as over-the-road vehicles. The laptop computer stand comprises a plurality of stainless steel members or arms that interconnect to form a frame. The arms may be removably attached to existing elements in a tractor-trailer truck cab so as to obviate permanent alteration to the cab. The frame operates in conjunction with a shock-absorbing bed which is adapted to receive the laptop computer during travel and which is further adapted to provide easy access for a driver (or passenger) of the vehicle, provide ventilation and cooling for the computer, and absorb shocks when the laptop computer is secured in the bed. The frame and bed assembly is adapted to be affixed to the passenger seat of a truck cab so as to be readily accessible to the truck driver while simultaneously being out of the way of a driver and/or a passenger in the cab.

2. Prior Art

Many over-the-road truck drivers carry their own laptop computers and utilize them in connection with their business, to keep track of their activities and to coordinate the computer with a global positioning system. However, no one in the past has proposed a laptop computer stand such as is presented herein.

SUMMARY OF THE INVENTION

The majority of over-the-road truck drivers do not own their own trucks and are prohibited to install any device which necessitates a permanent alteration or physical damage to the truck cab interior. Failure to abide by this results in substantial fines payable by the operator of the truck. The present device attaches to existing structure located on a standard passenger seat found in every standard over-the-road truck cab.

The safety features that result from the installation of a laptop computer system in an over-the-road truck cab are numerous. First, the driver can use the system in conjunction with a Global Positioning System ("GPS") device to locate the fastest route from Point A to Point B and to estimate travel time, distance, fuel requirements, etc. The computer can be utilized to keep track of travel logs, expenditures, safety checks, cargo paperwork, and the like, so that it may be accessed quickly and reduce driver downtime during off-loading of cargo at the destination. Cameras can be mounted at various locations along the exterior of the trailer portion of the tractor-trailer to provide better visual information for a driver, resulting in an increase in driver visibility and, consequently, overall safety to other vehicles on the road. Vehicle system information may also be monitored via the computer.

The present invention comprises a plurality of horizontal and vertical arms, with one curved arm and one diagonal arm, all interconnected, as will be described herein, to form a frame or stand for a laptop computer for the operator of a tractor-trailer truck and wherein the stand will be located adjacent and attached to the passenger seat in the cab of the truck. More particularly, the arms are preferably stainless steel telescoping members which are designed and assembled as a stand to hold a laptop computer over the seat on the passenger's side in a truck cab. The tubular arms are telescoping so that they can be adjusted to exactly the right dimensions to accommodate variations in internal dimensions in truck cabs. The stainless steel arms are also connected to the passenger seat in a way that the stand does not alter the design of the seat or make any modifications thereof. The stand includes a pair of horizontal side members or arms which are disposed substantially parallel to the longitudinal axis of the truck. A curved but primarily horizontal tubular member or arm connects transversely across the two horizontal arms from a point adjacent the forward end of the inboard horizontal arm to the forward end of the outboard horizontal arm. The curved horizontal arm also, at one end, connects with a vertical tubular arm which will eventually hold the bed for the laptop itself. An angled tubular brace or arm connects from mid-way of the vertical tubular arm to the rear of the passenger seat at a point where the inboard horizontal arm connects with the seat at a location corresponding to the place of attachment of the inboard seatbelt. The outboard horizontal arm is also connected to the chair at the location of the outboard seatbelt. The two horizontal longitudinal tubular arms are also connected intermediate their ends by means of bar clamps and L-shaped brackets that fasten through suitable screws to the underside of the passenger seat.

BRIEF DESCRIPTION OF THE DRAWINGS

FIG. 6 is a side view of the laptop bed of the present invention.

FIG. 7 is a side view of the stand portion of the present invention.

FIG. 8 is a side view of a bar clamp and an L-shaped bracket.

DETAILED DESCRIPTION OF THE PREFERRED EMBODIMENTS

Figure 1:
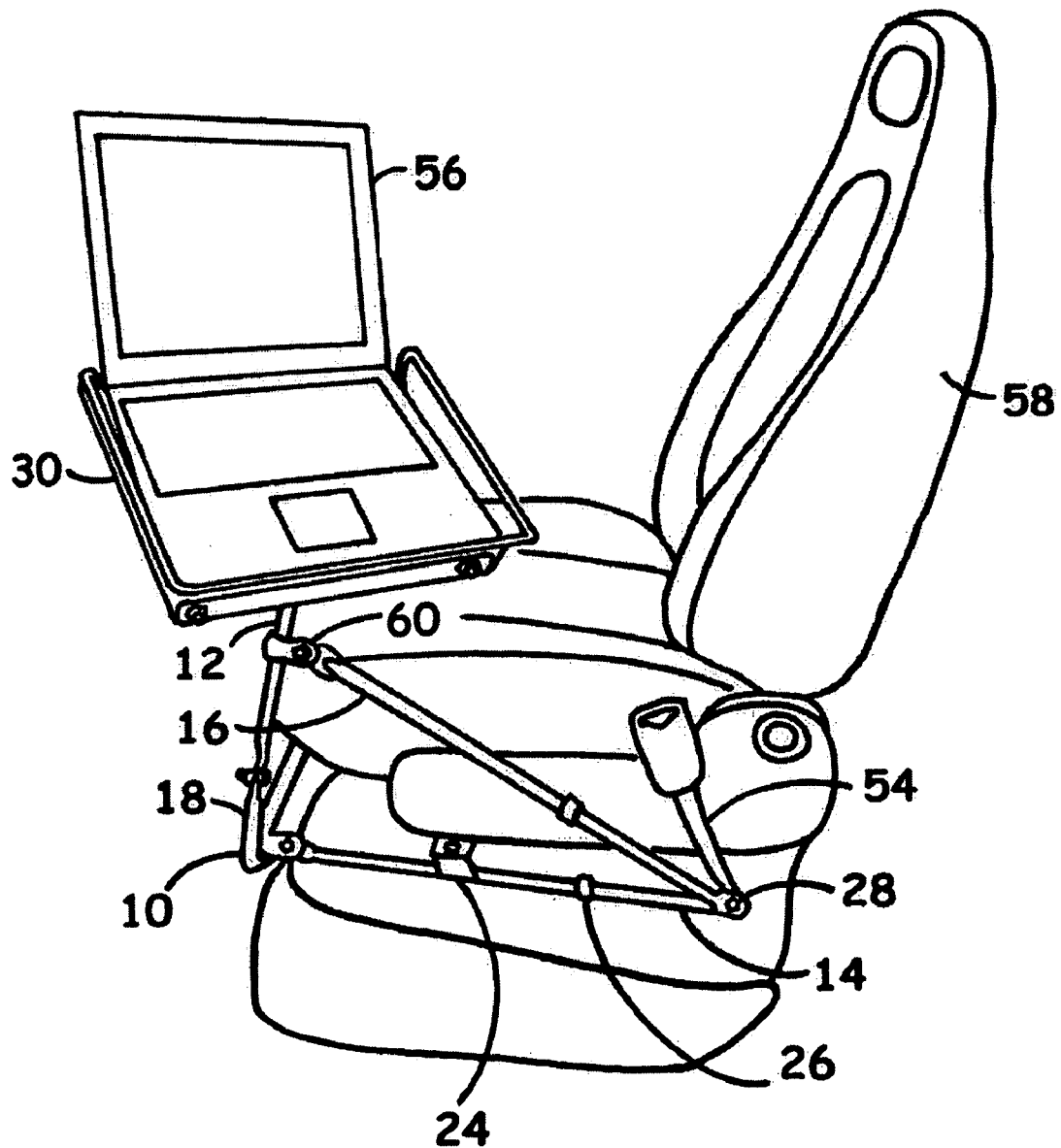
FIG. 1 is a perspective view showing the device of the present invention installed on a passenger seat and assembled with a laptop computer in the desired position.

The telescoping arms of the present invention comprise a plurality of stainless steel sections each having a first terminal end and a second terminal end, each section having a substantially cylindrical shape along the length thereof and tapering to a substantially flat shape at the first terminal end thereof, and the second terminal end of certain of the members having threads thereon which are adapted to be received within an adjustable nut 26, while other of the members have an adjustable nut 26 at the second terminal end. After the threaded portion is inserted and the desired length is achieved, the nut 26 is tightened to secure the telescoping member in place. This configuration permits each arm to be adjusted to accommodate a desired length such that each laptop computer stand unit 10 may be fully adjusted to fit any standard seat 58 thereby providing a one-size-fits-all unit. Further, horizontal arms may be joined to vertical arms by means of an adapter bracket 60, which adapter bracket 60 comprises a substantially cylindrical sleeve with two tabs extending therefrom in parallel spaced relation. Each substantially cylindrical sleeve is adapted to encircle a corresponding tubular member with two tabs extending outward in perpendicular relation to the cylindrical sleeve and the two tabs extending in parallel relation to one another. Each tab is provided with a hole therein through which a screw 28 may be threaded and each pair of parallel spaced tabs is adapted to receive a substantially flat end (not numbered) of a tubular member therebetween, the flat end being secured in place by threading a screw 28 through the tabs and the flat end and tightening the screw 28.

Referring to the drawings in detail, FIG. 1 shows a standard passenger seat 58 for a cab of an over-the-road vehicle with the laptop computer stand 10 of the present invention attached thereto. The laptop computer stand 10 attaches to existing members including a seatbelt holder 54 and screws or holes (not shown) located along the underside of a standard passenger seat 58 by means of bar clamps 24 which bar clamps 24 connect horizontal telescoping arms 14 and 20 to the underside of the seat 58 by L-shaped brackets 64 as will hereinafter be described. The telescoping tubular arms 14 and 20 extend horizontally on the inboard and outboard sides, respectively, of the passenger seat 58 parallel to the longitudinal axis of the vehicle.

A horizontally extending laptop computer bed 30 is adapted to receive a laptop computer 56 therein while providing cushioning, including shock absorption through the mounting (not shown) for the seat 58, together with support, cooling, and ventilation for the laptop computer 56 as will hereinafter be described in detail (see FIGS. 4 though 6). The laptop computer bed 30 is provided with a male projecting member 32 (see FIG. 6) which male projecting member 32 is adapted to be adjustably received within a female receiving member 22 (see FIGS. 2 and 7) in the form of a vertical tube as will hereinafter be described in detail (see FIGS. 2, 6 and 7).

Figure 2:
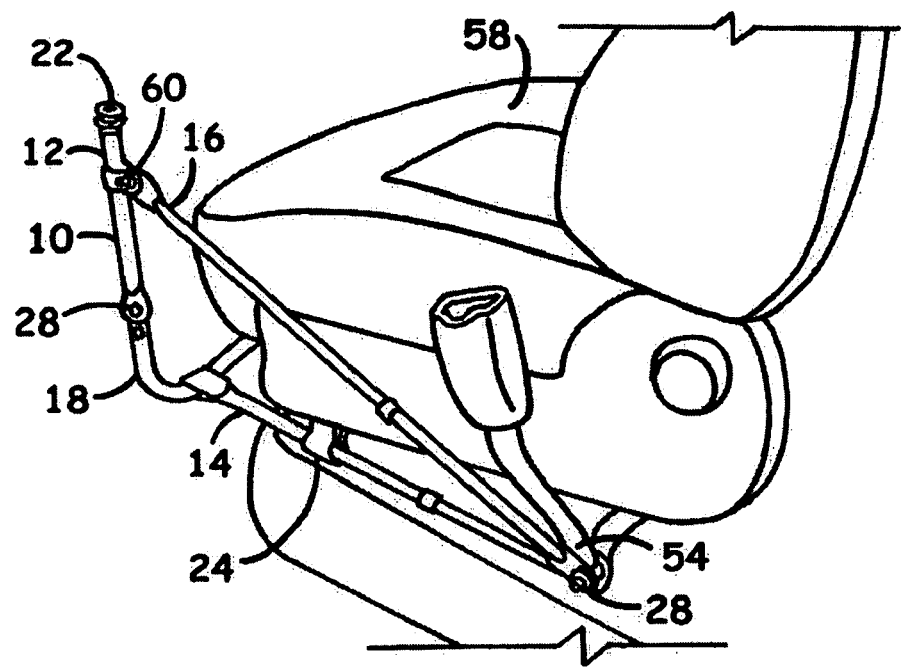
FIG. 2 is a perspective view of the left-hand side of a passenger seat showing the stand portion of the device of the present invention (with the laptop bed portion removed) as connected to the seat.

FIG. 2 shows the base section or support structure of the laptop computer stand 10 attached to the seat 58 of an over-the-road cab. The base section or support structure of the laptop computer stand 10 comprises a vertical tubular arm 12, a first horizontal telescoping arm 14, a diagonal telescoping arm 16, a curved telescoping arm 18, a second horizontal telescoping arm 20 (FIG. 3), a female receiving member 22, a pair of bar clamps 24, and a plurality of adjustable nuts 26 and screws 28. The right-hand end of the first horizontal telescoping arm 14 and the right-hand end of the diagonal telescoping arm 16 meet at the lower right-hand end of the laptop computer stand 10 and overlap each other at the flat ends thereof. Each of these flat ends (not numbered) is provided with a hole therein through which a screw 28 may be received.

The standard over-the-road cab seat 58 is provided with first and second seatbelt holders 54 on either side thereof, respectively, as well as bolts (not numbered) or holes therefor located on the underside of the seat 58. The flat end of the first horizontal telescoping arm 14 and the flat terminal end of the diagonal telescoping arm 16 removably attach to the cab seat 58 by removing the screw 28 located on the first inboard seatbelt holder 54, aligning the holes at the right hand ends of arms 14 and 16, and threading the screw through the overlapping ends, and through the seatbelt holder 54 and securing the screw 28 in place by tightening. The left-hand end of the first horizontal telescoping arm 14 connects with the curved telescoping arm 18 by means of an adapter bracket 60 received on the arm 18. The adapter bracket 60 comprises a substantially cylindrical sleeve with two tabs extending therefrom in parallel spaced relation (not numbered) as discussed above. The left hand end of the first horizontal telescoping arm 14 is flattened and is received between the two tabs (not numbered) on the adapter bracket 60 and secured by means of a screw 28. The left-hand end of the diagonal telescoping arm 16 connects with the vertical tubular arm 12 in the same manner above described, but with the left-hand end of the diagonal telescoping arm 16 being flattened and being received between the two tabs of the adapter bracket 60 mounted on the vertical tubular arm 12.

The vertical tubular arm 12 includes an upper end and a lower end, the lower end tapering to a substantially flat surface which is adapted to connect to the upper flattened end of the curved telescoping arm 18. The curved telescoping arm 18 has a vertical portion at the inboard end thereof which has an upper flattened end which is received against a corresponding flattened end on the lower end of the vertical tubular arm 12 as indicated above end thereof (not numbered), the first non-terminal end thereof tapering to a flat surface which is received against a corresponding flat surface on the vertical tubular arm 12, Each of the flat surfaces is provided with a hole centrally located thereon, and the two flat surfaces are connected by means of a screw 28 threaded through the holes and secured by tightening. The upper end of the vertical tubular arm 12 is a substantially circular opening or female receiving member 22 which is adapted to receive a male projecting member 32 (FIG. 6) as will hereinafter be described in detail (see FIGS. 6 and 7).

The curved telescoping arm 18 has a vertical portion, at its inboard end, connected at its upper end to the lower end of the vertical tubular arm 12. The curved tubular arm 18 also has a horizontal portion that extends transversely across the front of the seat 58 to a flattened end at the outboard side thereof, as will be explained further below.

A bar clamp 24 having a curved portion 66 (see FIG. 8) is adapted to surround each of the horizontal cylindrical telescoping arms 14 or 20 and to attach to an existing screw 28 or hole (not numbered) located on the underside of the seat 58 by means of threading the screw 28 through an opening in the L-shaped bracket 64 and the hole located on the underside of the seat 58 and securing by tightening the screw 28.

Figure 3:
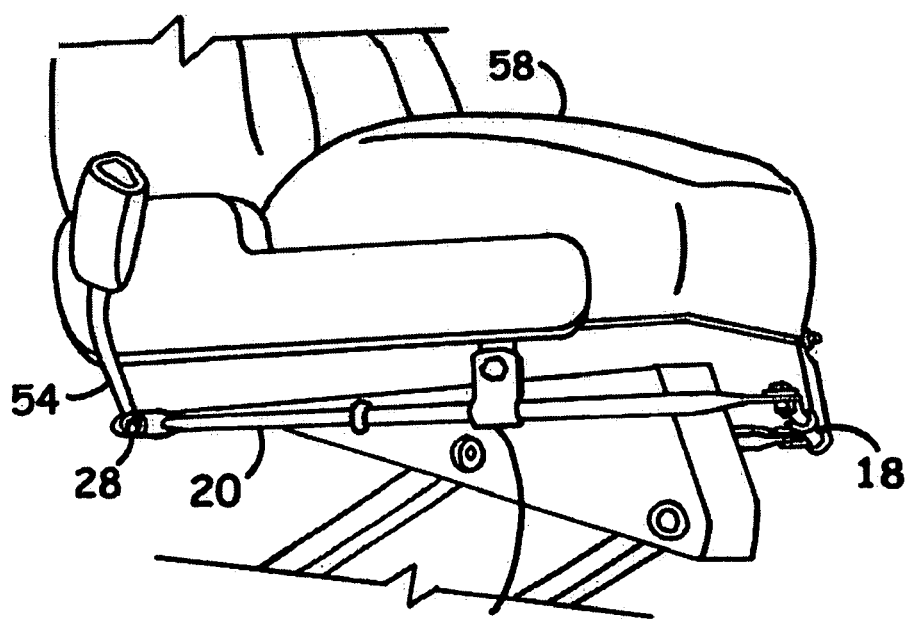
FIG. 3 is a perspective view of the right-hand side of a passenger seat showing the stand portion of the device of the present invention (with the laptop bed portion removed) as connected to the seat.

FIG. 3 is a continuation of FIG. 2 viewing from an opposite (outboard) side of the seat 58. As indicated above, the curved telescoping arm 18 is substantially cylindrical and has an outboard flattened end which connects with the right-hand (forward) end of a second horizontal telescoping arm 20 which is substantially cylindrical but flattened at the ends. The flat surfaces of arms 18 and 20 at the right of FIG. 3 are each provided with a hole centrally located thereon, and the two flat surfaces are connected by means of a screw 28 threaded through the holes and secured by tightening.

The left-hand end of the second horizontal telescoping arm 20, which comprises the second terminal end of the laptop computer stand 10, is adapted to attach to the second (outboard) seatbelt holder 54 by removing the screw 28 in the seatbelt holder 54 and aligning the flat terminal end of the second horizontal telescoping arm 20 and the existing hole in the seatbelt holder 54 and threading the screw through the second horizontal telescoping arm 20 and the seatbelt holder 54 and securing the screw in place by tightening, in the same manner as described previously.

Figure 4:
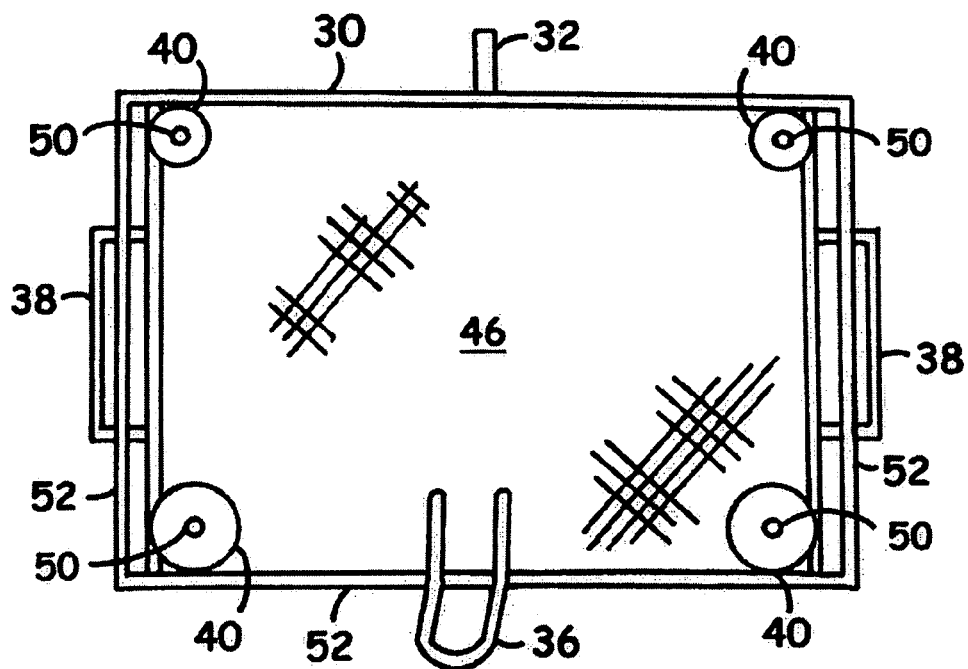
FIG. 4 is a top view of the laptop bed of the present invention.

FIG. 4 shows a top view of the laptop computer bed 30, the laptop computer bed 30 having a raised edge 52 along three sides thereof. The laptop computer bed 30 is provided with a mesh bed liner 46 adapted to facilitate proper ventilation for a laptop computer (not shown in this figure). Two handles 38 located opposite one another are adapted to allow a user to remove the laptop computer bed 30 from the laptop computer stand 10 (not shown in this figure). A support arm 36 is adapted to rest against the top (screen) portion of the laptop computer when the laptop computer is in the open position. Four cushion disks 40 are located at the four corners of the laptop computer bed 30 and adapted to receive the base of a laptop computer while preventing the base of the laptop computer from directly contacting the mesh bed liner 46, each cushion disk 40 being secured to the mesh bed liner 46 by means of a centrally located small screw 50. The laptop computer bed 30 is provided with a male projecting member 32 adapted to be received in the corresponding female receiving member 22 on the laptop computer stand 10.

Figure 5:
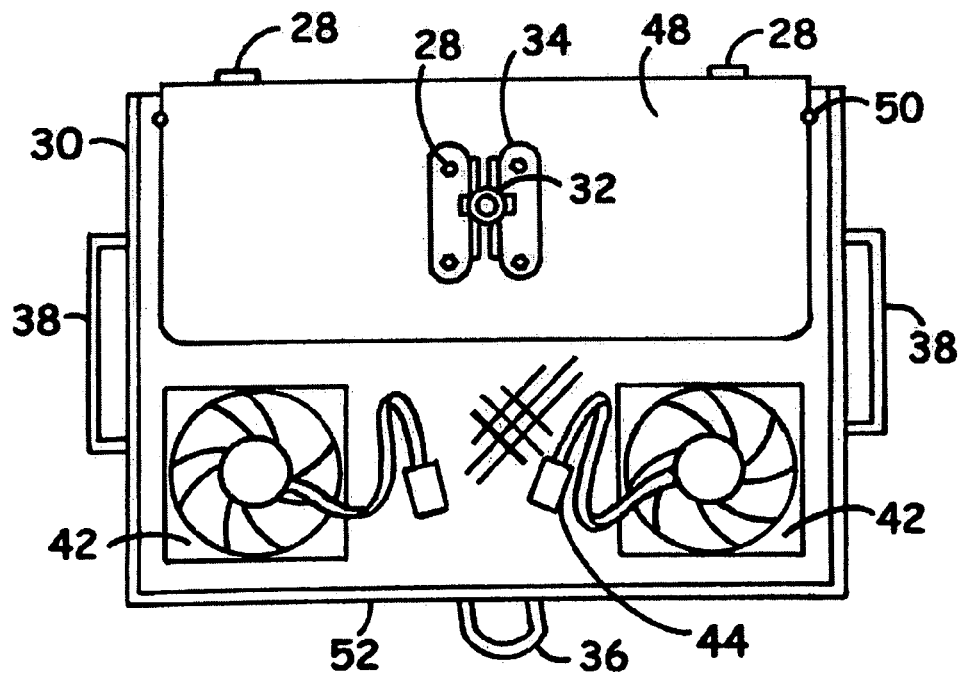
FIG. 5 is a bottom view of the laptop bed of the present invention.

FIG. 5 shows a bottom view of the laptop computer bed 30, the laptop computer bed 30 being provided with two fans 42 located thereon, each fan 42 being provided with a fan power cord 44 adapted to be received in a standard vehicle adapter (not shown) to provide power to the fans 42. The laptop computer bed 30 is further provided with a support plate 48 which attaches to the front portion of the raised edge 52 of the laptop computer bed 30 by means of two screws 28. The support plate 48 is further provided with an adjustable hinge 34 mounted centrally thereon by means of four screws 28. The adjustable hinge 34 is fitted with the male projecting member 32 (previously described) adapted to be received in the corresponding female receiving member 22 (not shown in this figure) on the laptop computer stand 10. The male projecting member 32 is attached to the adjustable hinge 34 by means of a screw 28.

When fully assembled, the support plate 48 provides support for the laptop computer bed 30 while only attaching to the laptop computer bed by means of the two screws 28 located along the front portion of the raised edge 52 of the laptop computer stand 10. Thus, the support plate 48 supports the weight of the laptop computer (not shown in this figure) while simultaneously permitting the laptop computer bed 30 to move in unison with the movement of the vehicle (not shown) to prevent jarring of the laptop computer bed 30 and laptop computer. The support plate 48 will receive any jarring (or shocks) related to vehicle movement while the minimal attachment of the support plate 48 to the laptop computer bed 30 via the screws 28 prevents jarring (or shocks) to the laptop computer.

FIG. 6 shows a side view of the laptop computer bed 30 being provided with cushion disks 40 located at the corners of the laptop computer bed 30, a support arm 36 adapted to rest against the back (top) portion of a laptop computer (not shown in this figure) when the computer is in the open position, the laptop computer bed 30 being further provided with an adjustable hinge 34 which adjustable hinge 34 is connected to a male projecting member 32 by means of a screw 28. The screw 28 located on the adjustable hinge 34 can be loosened to permit adjustment of the angle at which the male projecting member 32 is disposed, and then tightened when the desired angle is achieved, permitting adjustment of the laptop computer bed 30 to the desired position.

FIG. 7 shows a side view of the laptop computer stand 10, the laptop computer stand 10 being provided with a vertical tubular arm 12 having an upper end thereon, which end is an open female receiving member 22 into which the male projecting member 32 (not shown in this figure) may be received. The vertical tubular arm 12 is substantially cylindrical along its length but tapers to a substantially flat end at its lower end so as to form a hinge (not numbered) at the junction of the vertical tubular arm 12 and the curved telescoping arm 18. The curved telescoping arm 18 is substantially cylindrical along its length but tapers to a substantially flat end at an upper terminal end thereof (not numbered). As described in FIG. 2, the substantially flat ends of the curved telescoping arm 18 and the vertical tubular arm 12 each have a hole (not shown) located therein such that when the two ends overlap the vertical tubular arm 12 joins with the curved telescoping arm 18 by means of a screw 28 threaded through the respective holes (not shown).

FIG. 8 shows a bar clamp 24 having a reverse-R-shaped portion 62 together with an L-shaped bracket 64. The reverse-R-shaped portion has a first terminal end, a rounded central section 66, and a second non-terminal end (not numbered), the second non-terminal end has a hole therein through which a screw 28 may be received. The L-shaped bracket 64 has a vertical end and a horizontal end (not numbered), the vertical end has a hole therein through which a screw 28 may be received. The reverse-R-shaped portion 62 and the L-shaped bracket 64 are connected by means of aligning the holes (not numbered) at their respective non-terminal ends (not numbered), threading a screw 28 therethrough, and securing the screw 28 by tightening. The reverse-R-shaped portion 62 is provided with a rounded central section 66 which is adapted to receive or fit around tubular arms 14 and 20 or any substantially cylindrical arm discussed herein. The L-shaped bracket 64 is provided with a hole (not shown) at one end thereon to facilitate attachment of the bar clamp 24 to an existing screw 28 or hole (not numbered) in the underside of a seat 58 by removing an existing screw 28 in the underside of the seat 58 or, alternatively, by aligning the hole in the L-shaped bracket 64 with an existing hole in the underside of the seat, inserting a screw 28 therein, and securing by tightening the screw 28. In order to attach the base section or support structure of the laptop computer stand 10 to the seat 58 in a secure manner, a minimum of two bar clamps 24 should be employed, the reverse-R-shaped portion 62 of the clamps 24 being attached in spaced relation to the curved telescoping arm 18 or, in the alternative, one clamp 24 being attached to the first horizontal telescoping arm 14 and the second clamp 24 being attached to the second telescoping arm 20, each of the clamps 24 being attached by an L-shaped bracket 64 to the underside of the seat 58 at an existing location as above described.

What is claimed is:

1. A laptop computer stand for a cab for an over-the-road vehicle wherein the cab is provided with a passenger seat, comprising a pair of longitudinally extending horizontal arms having forward ends and rear ends, one horizontal arm being attached to an inboard side of the seat and the other horizontal arm being attached to an outboard side of the seat, a curved arm having a horizontal portion extending across the forward ends of the two horizontal arms and being connected thereto, a vertical arm having an upper end and a lower end, the curved arm also having a vertical portion at an inboard end thereof connecting with the lower end of the vertical arm, a diagonal arm connected to and extending from the vertical arm to the rear end of the inboard arm and being connected thereto, a horizontal rectangular bed for receiving and supporting a laptop computer thereon, means connecting the bed to the upper end of the vertical arm so as to support the laptop computer over the seat.

2. A laptop computer stand as set forth in claim 1 wherein the seat is provided with conventional seat belts at an inboard side and at an outboard side of the seat, the rear ends of the horizontal arms being attached to the seat at the locations of the inboard and outboard seatbelts, the horizontal arms also being attached intermediate their ends to the inboard and outboard sides of the seats.

3. A laptop computer stand as set forth in claim 2 wherein the upper end of the vertical arm constitutes a female receiving member, the bed having a male projecting member attached to an underside thereof, the male projecting member being received in the female receiving member so as to support the laptop computer over the seat.

4. A laptop computer stand as set forth in claim 1 wherein each arm is a stainless steel telescopic member with flattened ends.

5. A laptop computer stand as set forth in claim 1 wherein the computer bed is provided with cooling fans.

* * * * *